United States Patent [19]

Samuels et al.

[11] Patent Number: 5,525,700
[45] Date of Patent: Jun. 11, 1996

[54] LIQUID CRYSTALLINE POLYMER COMPOSITIONS

[75] Inventors: Michael R. Samuels, Wilmington; Marion G. Waggoner, Hockessin, both of Del.

[73] Assignee: E. I. Du Pont de Nemours and Company, Wilmington, Del.

[21] Appl. No.: 423,520

[22] Filed: Apr. 17, 1995

Related U.S. Application Data

[63] Continuation of Ser. No. 187,674, Jan. 27, 1994, abandoned, which is a continuation-in-part of Ser. No. 61,064, May 14, 1993, abandoned.

[51] Int. Cl.$^6$ ..................................... C08G 63/00
[52] U.S. Cl. ............... 528/190; 428/1; 428/480; 524/601; 524/604; 524/605; 528/193; 528/194
[58] Field of Search ..................... 528/190, 193, 528/194; 524/601, 604, 605; 428/1, 480

[56] References Cited

U.S. PATENT DOCUMENTS 4,983,713  1/1991  Hayashi et al. ......................... 528/190

*Primary Examiner*—James J. Seidleck
*Assistant Examiner*—Terressa M. Mosley

[57] ABSTRACT

This invention relates to liquid crystalline polymers (LCPs) derived from (I) hydroquinone and/or 4,4'-biphenol and/or bis(4-hydroxylphenyl) ether, (II) terephthalic acid, (III) 2,6-naphthalene dicarboxylic acid and/or 4,4'-bibenzoic acid, (IV) 4-hydroxybenzoic acid, (V) 6-hydroxy-2-naphthoic acid, and optionally (VI) an aliphatic diol in specified ratios. In addition to forming exceptionally tough films, the LCPs are useful as molding resins or for blending with other thermoplastic polymers.

18 Claims, 2 Drawing Sheets

LIQUID CRYSTALLINE POLYMER COMPOSITIONS

This is a continuation of application Ser. No. 08/187,164, filed Jan. 27, 1994, now abandoned, which is a continuation-in-part of application Ser. No. 08/061,064, filed May 14, 1993 and entitled Liquid Crystalline Polymer Compositions, now abandoned.

BACKGROUND OF THE INVENTION

This invention relates to novel liquid crystalline polymer compositions, the melting points of which way widely over the compositional range. This characteristic with respect to melting point makes the compositions particularly useful for blending with other polymers.

Liquid crystalline polymers ("LCPs"), including those made from a variety of aromatic diols, diacids and hydroxyacids, are down in the art. LCPs have varying physical properties, such as melting point (if any), heat deflection temperature, tensile strength, etc. Depending on these properties, LCPs are useful in many applications, such as molding resins, semipermeable membranes, blending, films, etc. The present invention relates to LCPs made from hydroquinone ("HQ") an&or 4,4'-biphenol ("BP") and/or bis(4-hydroxylphenyl) ether ("POP"), terephthalic acid ("TPA"), 2,6-naphthalene dicarboxylic acid ("NPA") and/or 4,4'-bibenzoic acid ("BB"), 4-hydroxybenzoic acid ("HBA"), 6-hydroxy-2-naphthoic acid ("HNA"), and op aromatic diacid in certain proportions. These LCPs are useful in typical LCP thermotropic applications, such as films and molding resins. In addition, these LCPs are useful for blending with other polymers, due to the melting point range mentioned above.

SUMMARY OF THE INVENTION

This invention relates to compositions comprising a liquid crystalline polymer comprising the following repeat units:

(I) at least one repeat unit selected from the group consisting of

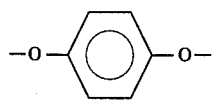

(IA),

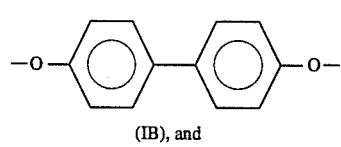

(IB), and

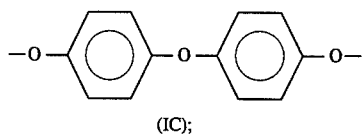

(IC);

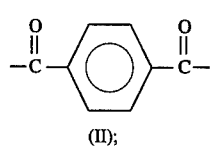

(II);

(III) at least one repeat unit selected from the group consisting of

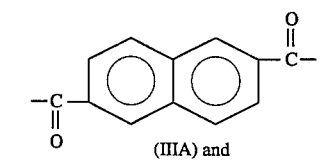

(IIIA) and

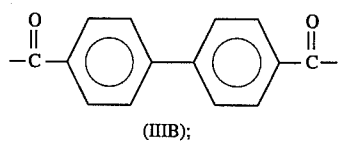

(IIIB);

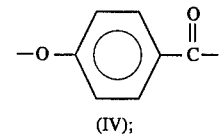

(IV);

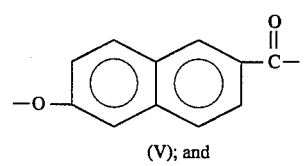

(V); and

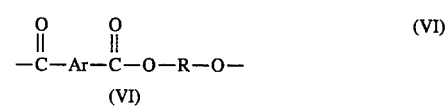

(VI)

wherein each Ar is independently a divalent aromatic radical, and each R is independently an alkylene radical containing 2 to 10 carbon atoms, and further wherein the molar ratio of (II) to (III) ranges from 25:75 to 90:10; the molar ratio of (I) to (II)+(III) is substantially 1:1; the molar ratio of (IV) to (V) ranges from 97:3 to 50:50; the number of moles of (IV) plus (V) ranges from 100 to 10 600 per 100 moles of (1); and provided that when $$\frac{(VI)}{(I)+(II)+(III)+(IV)+(V)+(VI)} < 0.05,$$

the number of moles of (V) satisfies the following equation:

$$(V) > \frac{8 + 0.04 \text{ [number of moles of (IV)]}}{0.96},$$

and also provided that $$0 \leq \frac{(VI)}{(I)+(II)+(III)+(IV)+(V)+(VI)} \leq 0.40,$$

wherein (I), (II), (III), (IV), (V) and (VI) are in units of moles. Throughout this Application the number of moles of (I) is the total moles of (IA) plus (IB) plus (IC) and the total number of moles of (III) is the total moles of (ILIA) plus (IIIB).

DETAILED DESCRIPTION

Figure 1:
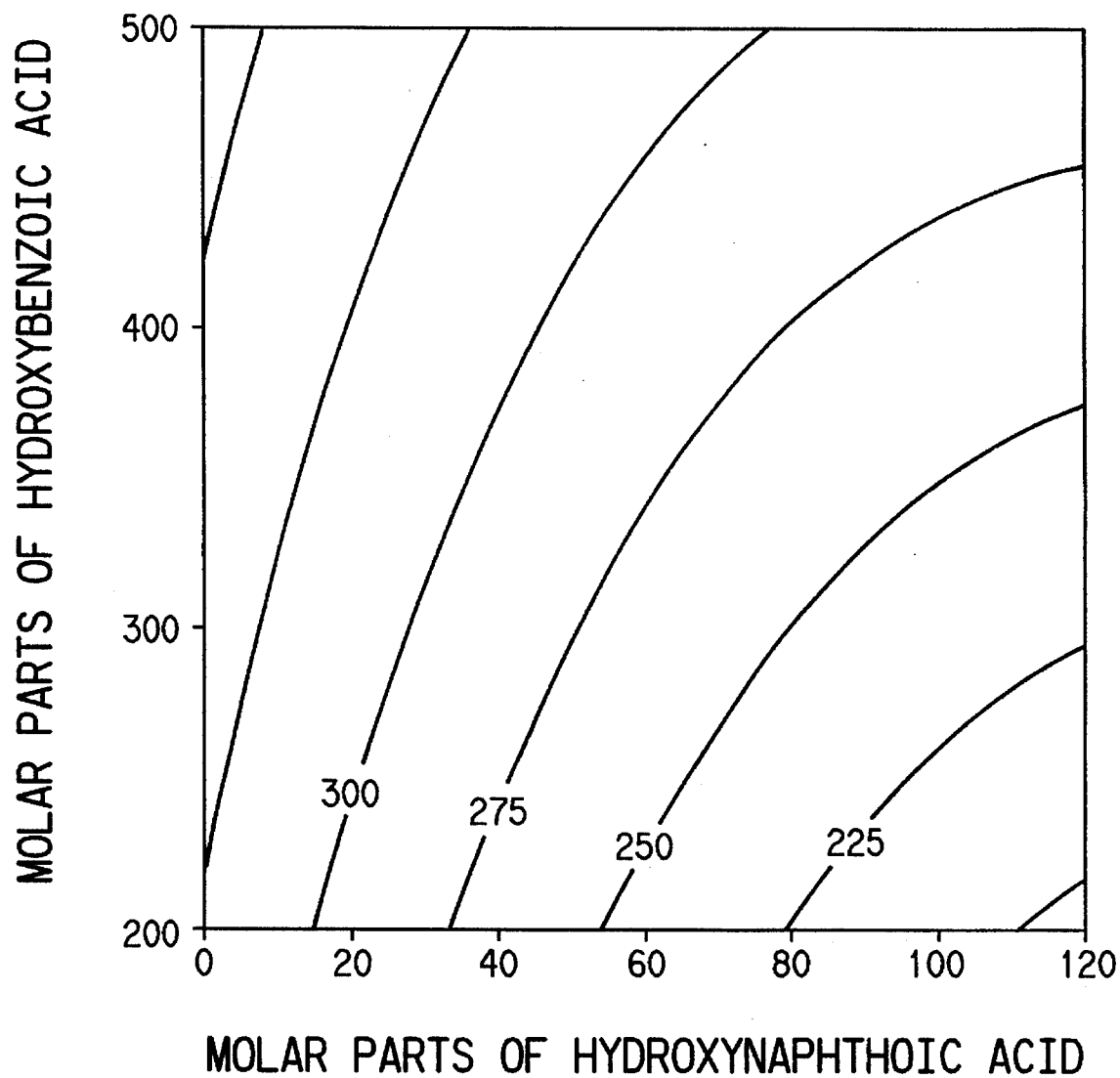
FIG. 1 is a graph representing the results of a statistical analysis f variations of melting points of certain liquid crystalline polymers of the present invention with variations of mole percent amounts of two monomer components of the polymers, 4-hydroxybenzoic acid and 6-hydroxy-2-naphtoic acid.

This invention relates to compositions comprising an LCP which is comprised of the repeat units given above. The molar ratio of repeat units (IA) to (IB) to (IC) ranges from 0:0:100 to 0:100:0 to 100:0:0. Preferably, repeat units (IA) and (IB) are present, with the molar ratio of (IA) to (IB) ranging from 1:99 to 99:1. In the more preferred LCP, repeat units (IA) and (IB) are present, with the molar ratio of (IA) to (IB) ranging from 75:25 to 25:75.

In the preferred LCP, the molar ratio of (II):(III) ranges from 30:70 to 85:15. The preferred range of the molar ratio of (IV):(V) is from 50:50 to 90:10. The preferred range of the number of moles of (IV) plus (V), per 100 moles of (I), ranges from 200 to 500.

It is understood by the artisan that in order to readily form high molecular weight LCP, the molar ratio of the diols [i.e., (IA), (IB) and/or (IC)] to the diacids [i.e., (II) and (IIIA) and/or (IIIB)] present in the polymerization of monomers to form an LCP should be about 1:1. Small deviations from this ratio are not critical, but large deviations are normally to be avoided, since it usually prevents or slows polymerization to relatively high molecular weight. The number of moles of (V) present in the instant LCPs satisfies the following equation A:

$$(V) > \frac{8 + 0.04 \text{ [number of moles of (IV)]}}{0.96}$$

when $$\frac{(VI)}{(I) + (II) + (III) + (IV) + (V) + (VI)} < 0.05,$$

wherein (I), (II), (III), (IV), (V) and (VI) are in units of moles.

In the preferred and most preferred LCPs, the number of moles of (V) satisfies the following equations B and C, respectively:

$$(V) > \frac{12 + 0.06 \text{[number of moles of (IV)]}}{0.94},$$

$$(V) > \frac{16 + 0.08 \text{[number of moles of (IV)]}}{0.92}.$$

It is further preferred that when $$\frac{(VI)}{(I) + (II) + (III) + (IV) + (V) + (VI)} < 0.10,$$

the amount of (V) is also controlled by equations A, B, or C.

In the above equations, the number of moles of (IV) and (V) is on the basis that the total number of moles of (I)+(II)+(III) is 200.

In other preferred LCPs, $$0 = \frac{(IC)}{(IA) + (IB) + (IC)}$$

and/or $$0 = \frac{(IIIB)}{(IIIA) + (IIIB)}.$$

The polymers of this invention may contain units (I)-(V). The polymers may also contain a repeat unit (VI) formally based on the formula

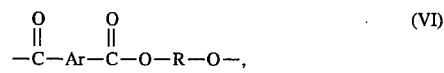

which can be thought of as the repeat unit of a partially aromatic polyester. By a "partially aromatic polyester" is meant a polyester based on one or more glycols containing 2 to 10 carbon atoms and an aromatic dicarboxylic acid (e.g., a diacid in which the carboxyl groups are bound directly to an aromatic ring). Such glycols include ethylene glycol, 1,4-butanediol, and 1,4-bis(hydroxymethyl)cyclohexane. Useful aromatic dicarboxylic acids include terephthalic acid, isophthalic acid, 4,4'-bibenzoic acid, and 2,6-naphthalene dicarboxylic acid.

In preferred partially aromatic polyesters, Ar is 1,4-phenylene and R is ethylene [derived from poly(ethylene terephthalate)], or Ar is 1,4-phenylene and R is 1,4-butylene [derived from poly(butylene terephthalate)], or Ar is 2,6naphthalene dicarboxylic acid and R is ethylene [derived from poly(ethylcne 2,6-naphthalenedioate)] or Ar is 1,4-butylene [derived from poly(butylene terephthalate)]. It is to be understood that once these units are incorporated in the liquid crystalline polymer of the present invention, the Ar and R portions of B the unit may not necessarily be joined together, but may be randomly distributed through the liquid crystalline polymer.

The amount (in moles) of repeat unit (VI) in the polymer is governed by the equation $$0 \leq \frac{(VI)}{(I) + (II) + (III) + (IV) + (V) + (VI)} \leq 0.40,$$

The amounts of (I), (II), (III), (IV), (V) and (VI) are in units of moles. In a preferred liquid crystalline polymer, the amount of (VI) is governed by the equation $$0.050 \leq \frac{(VI)}{(I) + (II) + (III) + (IV) + (V) + (VI)} \leq 0.20,$$

The repeat unit (VI) may be incorporated into the LCP by methods well known to the artisan. For instance, the partially aromatic polyester frrom which repeat unit (VI) is formally derived may be added to a polymerization in which the other repeat units are being polymerized from the monomers (or suitable derivatives thereof). Alternatively, (VI) may be incorporated into an already formed LCP by melt transesterification in a suitable mixer such as a twin screw extruder. The use of a transesterification catalyst is preferred. Sufficient transesterification is deemed to have taken place when the original melting points (assuming the partially aromatic polyester has a melting point) of the LCP and partially aromatic polyester cannot be detected by Differential Scanning Calorimetry( as measured by modified ASTM D3418-82, see below).

The LCPs of the present invention are useful as molding resins for molding electrical connectors, films, etc., and are especially useful for blending with other polymers. Generally speaking, when blending two polymers together, it is undesirable to greatly exceed the normal processing temperature of the polymer that would be processed at the lower temperature. For example, with a crystalline polymer, the normal processing temperature thereof would often be 10°–30° C. above its melting point. Such a limitation on processing temperature may be necessary, for example, because the high temperature stability of the polymer may be limited. As shown in FIG. 1, compositional variation in the instant LCPs, particularly variation in the amount of I-IBA and HNA, gives large changes in the melting point of the LCP. The melting point range of the present LCPs is generally at 200°–300° C., which is a temperature range in which many commonly used polymers are processed. Blends of polymer with the instant LCPs are useful, for example, as molding resins and for films. The instant LCPs have good physical properties, such as tensile elongation, tensile strength, flexural strength, etc.

The instant LCPs may be made by methods readily available or well known to those skilled in the art. For example, acetate esters of the hydroxyl groups in the starting materials may be condensed with the carboxylic acids present in the monomers, which is the method used in the examples herein, or the phenyl esters of the carboxyl groups present in the monomers may be condensed with the hydroxyl groups in the monomers.

The LCPs described above can contain, or can be compounded with, other additives, ingredients, and modifiers known to be added to, or compounded into, LCPs, such as, but not limited to, fillers (such as glass), carbon fiber, catalysts, nucleants, pigments, antioxidants, stabilizers, plasticizers, lubricants, tougheners, minerals, carbon black, synergists, glass reinforcing agents, calcium metasilicate, calcium carbonate, talc, titanium dioxide, and calcined aluminum silicate.

Films made from the instant LCPs can be made using conventional methods including simple extrusion. Particularly good films are obtained by extrusion using the apparatus described in U.S. Pat. Nos. 4,963,428 and 4,973,442 (especially FIGS. 3 and 6), the disclosures of which are hereby incorporated by reference.

The relative overall orientations of the LCP in the film can be varied by proper choice of the extrusion conditions (including die variables), and films with relatively balanced properties in the machine and transverse direction can be obtained.. Further, molecular orientation can be adjusted so that the predominant orientation is in the machine or transverse direction. By "balanced properties" is meant at least two of tensile strength, tensile modulus and tensile elongation of a particular film are within 20% (relative) of each other in the machine direction and transverse direction for each physical property.

EXAMPLES

Abbreviations for the various monomers used in the Examples are as follows:

"HQ"= hydroquinone,

"BP"=4,4'-biphenol

"TPA"=terephthalic acid,

"NPA"=2,6-naphthalene dicarboxylic acid,

"HBA"=4-hydroxybenzoic acid, (which contained 1,000–1,600 ppm potassium), and

"HNA"=6-hydroxy-2-naphthoic acid

"BB"=4,4'-bibenzoic acid

"POP"=bis(4-hydroxylphenyl) ether.

The amount, in relative moles, of each monomer used to make an LCP in the Examples is given in Table 2, below. Melting points (Tm) were determined by ASTM D3418-82, at a heating rate of 25° C./min. Tm was measured on the as-made polymer (first heat). Heat deflection temperature (HDT) was measured by ASTM D648 at 1.8 MPa.

Acetic anhydride was present in all polymerizations in an amount of 3 to 10% molar excess based on hydroxyl groups present

EXAMPLES 1–14

Preparation of the LCP

The LCPs in the Examples below were prepared as described below, wherein the values for X1 through X4 are provided in Table 1, below, and wherein the reactants, and amounts thereof, are provided in Table 2, below. The reactants were charged, in a nitrogen atmosphere, into a reaction vessel equipped with a Vigreaux Column, condenser, and a stirrer (stir speed set at 125 RPM). The resultant reaction mixture was heated to reflux. Reflux began at a pot temperature of approximately 150° C. The reaction mixture was refluxed about forty minutes, at constant temperature. During the next fifty minutes, the pot temperature was slowly raised to about X1, during which time acetic acid byproduct was removed. Pressure was then reduced over the next approximately X2 minutes to about 133 Pa (abs), while the stirrer speed was reduced to 20 RPM and the pot temperature increased to about X3. The polymerization was terminated approximately X4 hours after charging of the ingredients. The resultant product was removed from the reaction vessel with a scooping tool, rapidly cooled to room temperature, and ground.

Compounding of the LCP with Glass Fiber

The LCPs of Examples 1–4 were each compounded with glass fiber. Compounding was done in a 28 mm Werner and Pfieidcrer twin screw extruder having a zone with conventional conveying elements, kneading, or mixing elements, along with a low pressure zone with venting under vacuum of any volatiles from the polymer melt and a die. As the compounded LCP S compositions exited the die, they were quenched with a water spray and cut into pellets with a conventional strand cutter. The extruder barrel and die temperatures were maintained at about 290°–320° C. and 300°–320° C., respectively.

Molding of LCP Compositions into Test Bars

Prior to molding, the LCP pellets were dried overnight for about 16 hours in a vacuum over, with a nitrogen purge, at 100°–130° C. The dried polymer pellets were molded into standard test bars, as required per ASTM D638 for determining tensile properties, on either a 42.5g Arburg molding machine or a 170g HPM molding machine, with barrel temperature settings of 330°–360° C. and injection pressures of 27–41 MPa. Examples 1–4 contained 30% glass fiber. Examples 5–14 were neat polymers.

Results

The LCPs were tested for melting point (Tm) on the as made polymer and for HDT on molded polymer bars. The results are provided in Table 2, below.

Figure 2:
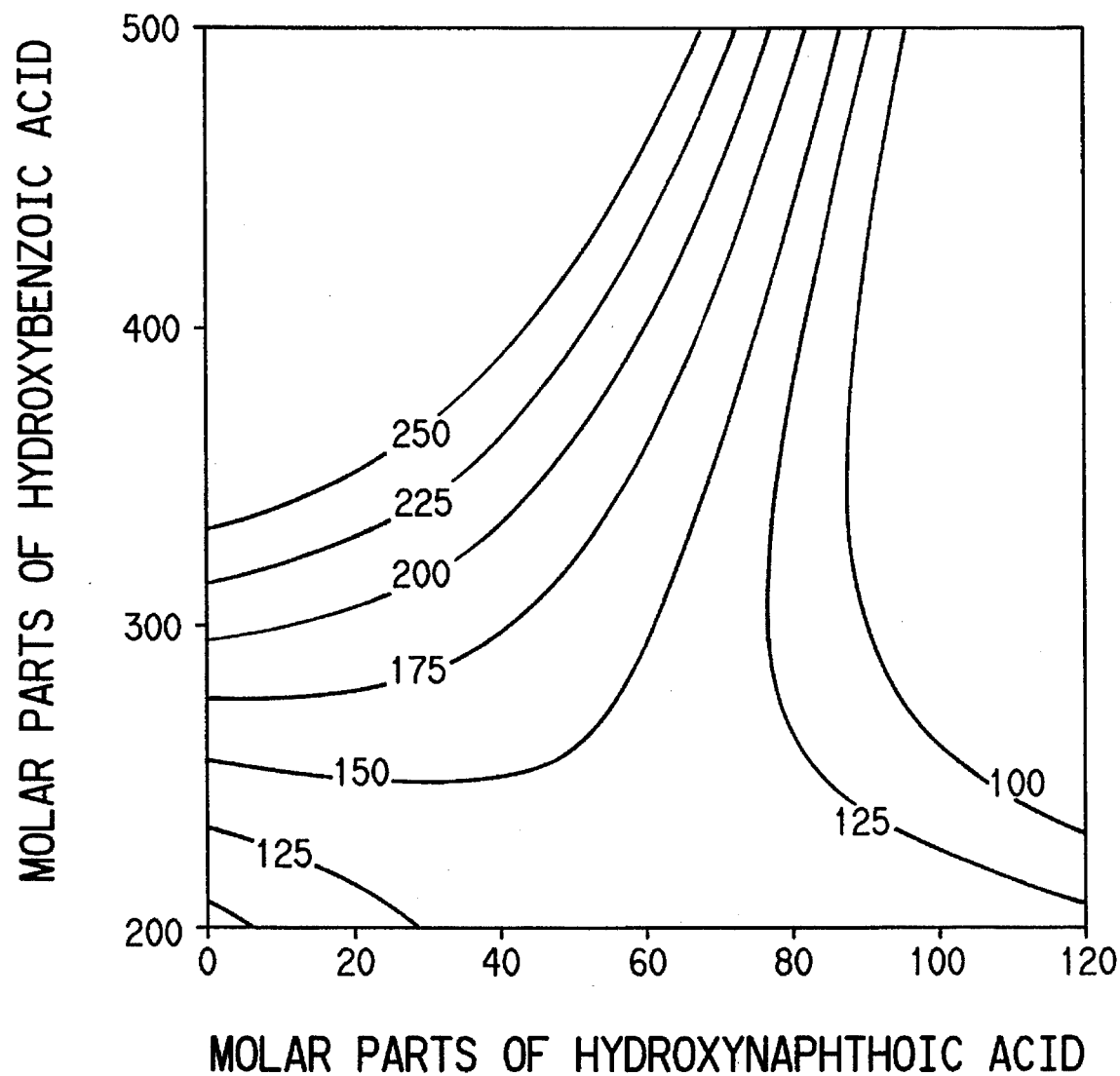
FIG. 2 is a graph representing the results of a statistical analysis of variations of heat deflection temperatures of the same liquid crystalline polymers with variations of mole percent amounts of 4-hydroxybenzoic acid and 6-hydroxy-2-naphtoic acid.

FIGS. 1 and 2 show the results of statistical analyses of the melting points and HDT values obtained for Examples 6 to 14. The data were analyzed and plotted using a program from SYSTAT, Inc., Evanston, IL, U.S.A. called SYSTAT for Windows, Version 5, and using the contour plot routine. In FIG. 1, the contour lines are constant melting point lines (valued as indicated), while varying the HBA and HNA amounts in the LCPs. FIG. 2 is similar, except the values used are HDTs (of neat LCP).

TABLE 1

| Example | X1 Temp. after Reflux | X2 Vacuum Cycle | X3 Final Temp. | X4 Run Length |
| --- | --- | --- | --- | --- |
| 1 | 360 | 120 | 360 | 6 |

TABLE 1-continued

| Example | X1 Temp. after Reflux | X2 Vacuum Cycle | X3 Final Temp. | X4 Run Length |
|---|---|---|---|---|
| 2 | 360 | 110 | 360 | 6.5 |
| 3 | 360 | 120 | 360 | 7 |
| 4 | 360 | 120 | 360 | 7 |
| 5 | 360 | 85 | 360 | 4.3 |
| 6 | 340 | 240 | 360 | 9 |
| 7 | 350 | 195 | 360 | 8.7 |
| 8 | 360 | 170 | 360 | 7.5 |
| 9 | 360 | 95 | 360 | 5.3 |
| 10 | 360 | 170 | 360 | 5.6 |
| 11 | 360 | 170 | 360 | 5.4 |
| 12 | 360 | 120 | 360 | 5 |
| 13 | 360 | 125 | 360 | 5 |
| 14 | 360 | 84 | 360 | 4.3 |

TABLE 2

| Ex. No. | HQ | BP | TPA | NPA | HBA | HNA | Wt % Glass Fiber[1] | Tm | HDT |
|---|---|---|---|---|---|---|---|---|---|
| 1 | 50 | 50 | 85 | 15 | 320 | 100 | 30 | 249 | 197 |
| 2 | 50 | 50 | 50 | 50 | 200 | 200 | 30 | 197 | 159 |
| 3 | 100 | 0 | 70 | 30 | 320 | 100 | 30 | 219 | 184 |
| 4 | 0 | 100 | 70 | 30 | 320 | 100 | 30 | 282 | 226 |
| 5 | 50 | 50 | 60 | 40 | 300 | 40 | — | — | 181 |
| 6 | 50 | 50 | 70 | 30 | 270 | 50 | — | 280 | 160 |
| 7 | 50 | 50 | 70 | 30 | 250 | 70 | — | 231 | 120 |
| 8 | 50 | 50 | 70 | 30 | 230 | 90 | — | 230 | 133 |
| 9 | 50 | 50 | 70 | 30 | 400 | 80 | — | 273 | 135 |
| 10 | 50 | 50 | 70 | 30 | 300 | 80 | — | 248 | 117 |
| 11 | 50 | 50 | 70 | 30 | 400 | 40 | — | 312 | — |
| 12 | 50 | 50 | 70 | 30 | 210 | 110 | — | 205 | 138 |
| 13 | 50 | 50 | 70 | 30 | 270 | 50 | — | 265 | 171 |
| 14 | 50 | 50 | 70 | 30 | 200 | 100 | — | 207 | 143 |

[1] based upon the weight of the LCP and glass fiber only.

EXAMPLES 15–19

Films were made from a polymer having the same composition as that of Example 6 above. The polymer had a melting point of about 266° C. and contained no fillers.

Two different dies were used to make the films. For Example 15, a die similar to that shown in FIG. 8 of U.S. Pat. No. 4,973,442, and modified as described for thermotropic LCPs in U.S. Pat. No. 4,963,428 (428) at column 9, line 57 to colunto 10, line 55 was used. The die had the dimensions given in Table II of '428 as the "Xydar Die". Polymer was fed into the die at a rate of 0.6 mL per revolution of the die by a 25 mm Berstorff co-rotating twin screw extruder. The heating zones of the extruder were set (from rear to front) at 260, 271, 279, 274 and 274° C. The die temperature was set at 279° C. Upon exiting the die, the polymer tube was blown (with air) to a diameter of 20.3 cm. The resulting film tube was slit and tested in the machine and transverse directions. Additional data concerning the extrusion conditions are shown in Table 3, and film physical properties are shown in Table 4.

For Examples 16–19, films were made using a die similar to that shown in FIG. 1 of WO 90/15706. DimensiOns of Parts 32, 34 and 36 are as given in Table 2 of 428.

The polymer was fed into the die at a rate of 0.6 mL per revolution of the die by a 25 mm Berstorff co-rotating twin screw extruder. The heating zones of the extruder and die were the same as in Example 15. Upon exiting the die, the polymer tube was blown (with air) to a diameter of 7.6 cm. The resulting film tube was slit and tested in the machine and transverse directions. Additional data concerning the extrusion conditions are shown in Table 3, and film physical properties are shown in Table 4.

Tensile properties were determined by ASTM D882, using a testing speed of 10% of the initial gage length per minute. The initial gage length was 7.62 cm, and the width of the sample was 0.508 cm. Properties were measured in both the machine direction (MD) and the transverse direction (TD).

TABLE 3

| Example No. | Die Rotation (rpm) | Takeup Speed m/min | Melt Temp. (°C.) |
|---|---|---|---|
| 15 | 8.5 | 2.9 | 299 |
| 16 | 8.0 | 5.3 | 311 |
| 17 | 8.0 | 10.4 | 311 |
| 18 | 4.0 | 2.5 | 311 |
| 19 | 1.5 | 1.0 | 311 |

TABLE 4

| Example No. | Film Thickness (mm) | Test Direction | Modulus (GPa) | Tensile Strength (MPa) | Percent Elongation at Break |
|---|---|---|---|---|---|
| 15 | 0.051 | MD | 8.20 | 224 | 12.5 |
|  |  | TD | 7.17 | 217 | 12.8 |
| 16 | 0.025 | MD | 17.2 | 315 | 6.1 |
|  |  | TD | 6.48 | 162 | 8.0 |
| 17 | 0.018 | MD | 40.7 | 430 | 1.4 |
|  |  | TD | 2.27 | 48.9 | 9.7 |
| 18 | 0.051 | MD | 8.68 | 205 | 15.0 |
|  |  | TD | 6.61 | 176 | 13.3 |
| 19 | 0.18 | MD | 3.58 | 91.6 | 19.1 |
|  |  | TD | 10.4 | 247 | 7.9 |

EXAMPLE 20

The polymer used in Example 20 had HQ/BP/TPA/NPA/ItBA/HNA molar ratios of 50/50/70/30/270/50, and had a melting point of about 276° C. A sample of this polymer was extruded through a 28 mm Werner & Pfleiderer twin screw extruder equipped with an adjustable slit die that was 25.4 cm wide and the slit of which was adjusted to give a film about 0.9 mm thick. All of the barrel heating zones were set to 270° C., except for the rear zone which was set to 220° C. The film was drawn slightly on exiting the die. The resulting film was relatively tough in both the machine and transverse directions.

EXAMPLES 21–23

For each of the LCP compositions in Examples 21-23, the reactants, IS including the partially aromatic polyester, were charged into a reaction vessel equipped with a Vigreux column, condenser, and a stirrer (speed set at 50 rpm). The reactants initially charged are listed in Table 5. The resultant reaction mixture was heated to reflux. Reflux began at a pot temperature of between 155° C. and 160° C. The reaction mixture was refluxed for about 40 minutes, at a constant pot temperature of about 170° C. After the total reflux was completed, the pot temperature was raised to 190° C., and removal of by-product acetic acid began. Thereafter, while continuing to remove acetic acid, the temperature was increased by 20° C. increments at 20 minute intervals, until the temperature had reached 305° C. A vacuum was then applied to reduce the pressure to about 80 kPa (absolute). The pressure was further reduced in 16.7 kPa increments every 10 minutes until a pressure of 16.7 kPa was reached. Thereafter, in the next three 10 minute intervals, the pressure was reduced to 6.7 kPa, 2.7 kPa and finally, to full vacuum (less than 13.3 Pa absolute). As the viscosity increased, the stirrer speed was reduced to about 30 rpm. The polymerization was terminated when the melt viscosity was greater than or equal to 25 Pa.s at 365° C. and 1000 sec$^{-1}$ shear rate. The total reaction time after the components were initially charged into the reaction vessel was approximately 7–8 hours. The melting points of the resulting polymers are shown in Table 5.

TABLE 5

| Example No. | HQ (g) | BP (g) | TPA (g) | NPA (g) | HBA (g) | HNA (g) | Partially Ar. Polyester (g) | Tm (°C.) |
|---|---|---|---|---|---|---|---|---|
| 21 | 63.1 | 106.8 | 133.4 | 74.4 | 427.8 | 107.9 | 44.0 (PET) | 265 |
| 22 | 60.0 | 101.5 | 126.8 | 70.7 | 406.7 | 102.6 | 83.8 (PET) | 247 |
| 23 | 58.5 | 99.0 | 123.6 | 69.0 | 396.5 | 100.0 | 102.9 (PEN) | 194, 222 |

PET = poly (ethylene terephthalate)
PEN = poly(ethylene 2,6-naphthalenedioate)

EXAMPLES 24–26

The polymers of Examples 24–26 were made by the same method used for Examples 21–23. Monomers used for the polymerizations are shown in Table 6, along with the melting point of the polymers.

TABLE 6

| Ex. No. | HQ (g) | BP (g) | TPA (g) | NPA (g) | HBA (g) | HNA (g) | Other (g) | Tm (°C.) |
|---|---|---|---|---|---|---|---|---|
| 24 | 63.5 | 107.4 | 103.8 | 0 | 477.9 | 86.8 | 122.7 (BB) | 268.8 |
| 25 | 115.0 | 0 | 117.7 | 33.9 | 461.7 | 196.6 | 41.7 (BB) | 275.2 |
| 26 | 52.5 | 88.7 | 138.5 | 77.3 | 444.3 | 112.1 | 48.2 (POP) | 245.0 |

What is claimed is:

1. A composition comprising a liquid crystalline polyester (LCP) that comprises the following repeat units:

(I) at least one repeat unit selected from the group consisting of

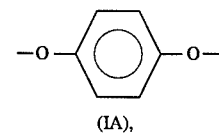

(IA),

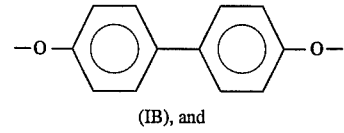

(IB), and

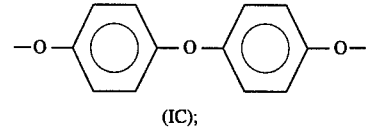

(IC);

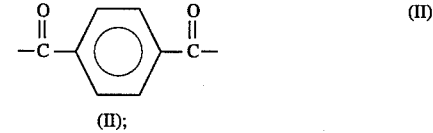

(II);

(III) at least one repeat unit selected from the group consisting of

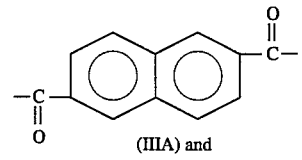

(IIIA) and

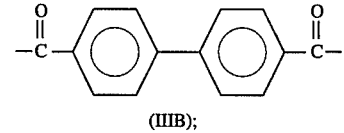

(IIIB);

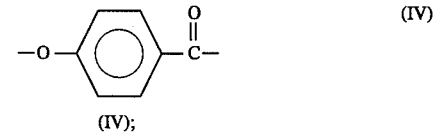

(IV);

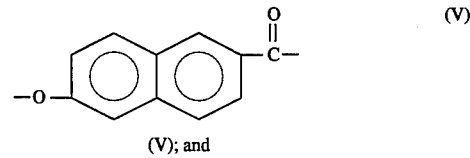

(V); and

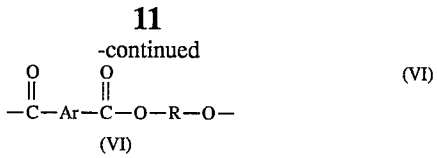

(VI)

wherein each Ar is independently a divalent aromatic radical, and each R is independently an alkylene radical containing 2 to 10 carbon atoms, and further wherein the molar ratio of (II) to (III) ranges from 25:75 to 90:10; the molar ratio of (I) to (II)+(III) is substantially 1:1; the molar ratio of (IV) to (V) ranges from 97:3 to 50:50; the number of moles of (IV) plus (V) ranges from 100 to 600 per 100 moles of (I); and provided that when $$\frac{(VI)}{(I)+(II)+(III)+(IV)+(V)+(VI)} < 0.05,$$

the number of moles of (V) satisfies the following equation:

$$(V) > \frac{8 + 0.04\,[\text{number of moles of (IV)}]}{0.96},$$

and also provided that $$0 \leq \frac{(VI)}{(I)+(II)+(III)+(IV)+(V)+(VI)} \leq 0.40,$$

wherein (I), (II), (III), (IV), (V) and (VI) are in units of moles.

2. A composition comprising a liquid crystalline polyester (LCP) that consists essentially of the following repeat units:

(I) at least one repeat unit selected from the group consisting of

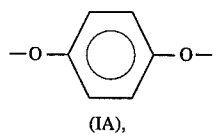

(IA),

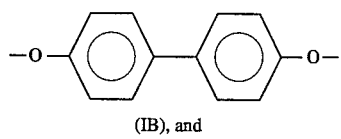

(IB), and

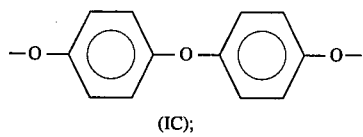

(IC);

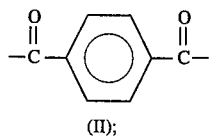

(II);

(III) at least one repeat unit selected from the group consisting of

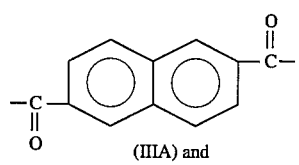

(IIIA) and

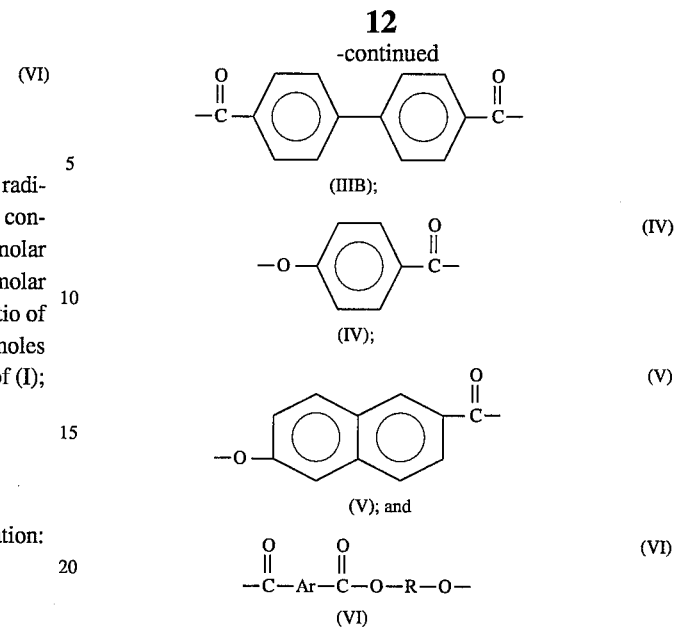

wherein each Ar is independently a divalent aromatic radical, and each R is independently an alkylene radical containing 2 to 10 carbon atoms, and further wherein the molar ratio of (II) to (III) ranges from 25:75 to 90:10; the molar ratio of (I) to (II)+(III) is substantially 1:1; the molar ratio of (IV) to (V) ranges from 97:3 to 50:50; the number of moles of (IV) plus (V) ranges from 100 to 600 per 100 moles of (I); and provided that when $$\frac{(VI)}{(I)+(II)+(III)+(IV)+(V)+(VI)} < 0.05,$$

the number of moles of (V) satisfies the following equation:

$$(V) > \frac{8 + 0.04\,[\text{number of moles of (IV)}]}{0.96},$$

and also provided that $$0 \leq \frac{(VI)}{(I)+(II)+(III)+(IV)+(V)+(VI)} \leq 0.40,$$

wherein (I), (II), (III), (IV), (V) and (VI) are in units of moles.

3. The composition of claim 2 wherein $$\frac{(VI)}{(I)+(II)+(III)+(IV)+(V)+(VI)} = 0,$$

$$\frac{(IC)}{(IA)+(IB)+(IC)} = 0 \text{ and}$$

$$\frac{(IIIB)}{(IIIA)+(IIIB)} = 0.$$

4. The composition of claim 3 wherein (IA) and (IB) are both present and the molar ratio of (IA) to (IB) ranges from 99:1 to 1:99.

5. The composition of claim 4 wherein the molar ratio of (IA) to (IB) ranges from 75:25 to 25:75.

6. The composition of claim 3 wherein the molar ratio of (II) to (III) ranges from 30:70 to 85:15.

7. The composition of claim 3 wherein the molar ratio of (IV) to (V) ranges from 50:50 to 90:10.

8. The composition of claim 3 wherein the number of moles of (IV) plus (V) is 200 to 500 per 100 moles of (1).

9. The composition of claim 8 wherein (IA) and (IB) are both present and the molar ratio of (IA) to (IB) ranges from 75:25 to 25:75, the molar ratio of(II) to (III) ranges from 30:70 to 85:15, and the molar ratio of(IV) to (V) ranges from 50:50 to 90:10.

10. The composition of claim 2 wherein the amount of (V) satisfies the following equation:

$$(V) > \frac{12 + 0.06[\text{number of moles of (IV)}]}{0.94}.$$

11. The composition of claim 3 wherein the amount of (V) satisfies the following equation:

number of moles of $$(V) > \frac{12 + 0.06[\text{number of moles of (IV)}]}{0.94}.$$

12. The composition of claim 2 further comprised of at least one of fillers, carbon fiber, catalysts, nucleants, pigments, antioxidants, stabilizers, plasticisers, lubricants, tougheners, minerals, carbon black, synergists, glass reinforcing agents, calcium metasilicate, calcium carbonate, talc, titanium dioxide, and calcined aluminum silicate.

13. The composition of claim 2 wherein the amount of (VI) present satisfies the following equation:

$$0.050 \leq \frac{(VI)}{(I) + (II) + (III) + (IV) + (V) + (VI)} \leq 0.20.$$

14. The composition of claim 2 wherein Ar is selected from 1,4-phenylene or 2,6-naphthalene and R is selected frown ethylene or 1,4-butylene.

15. The composition of claim 13 wherein Ar is selected from 1,4-phenylene or 2,6-naphthalene and R is selected from ethylene or 1,4-butylene.

16. A film comprising the composition of claim 1.

17. A film comprising the composition of claim 2.

18. A film comprising the composition of claim 3.

* * * * *